Dec. 8, 1953 H. M. ROCKWELL 2,661,793
CIRCUMFERENTIALLY TRAVELING TYPE TIRE
MOUNTING AND DEMOUNTING APPARATUS
Filed July 2, 1947 2 Sheets-Sheet 1
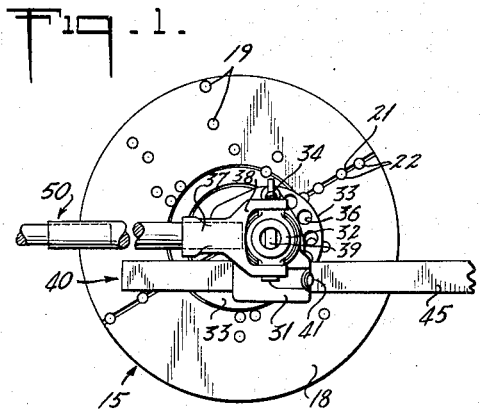
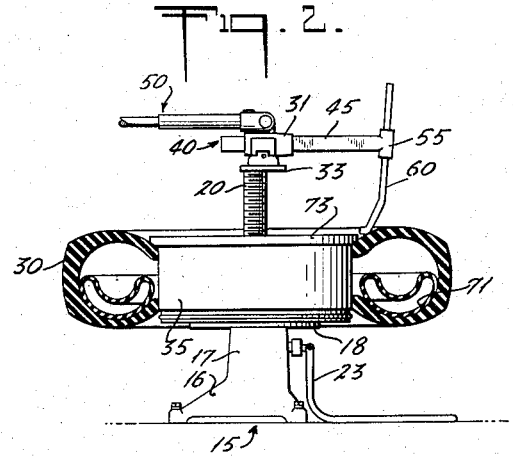
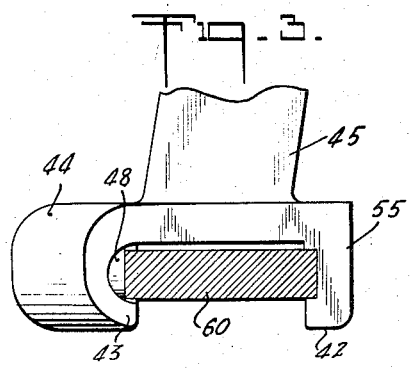
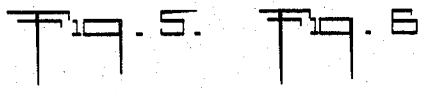
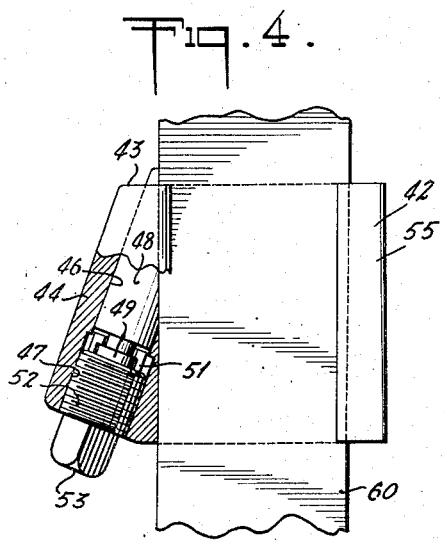
INVENTOR
HUGH M. ROCKWELL
BY *Alfred E. Page*
ATTORNEY Dec. 8, 1953    H. M. ROCKWELL    2,661,793
CIRCUMFERENTIALLY TRAVELING TYPE TIRE
MOUNTING AND DEMOUNTING APPARATUS
Filed July 2, 1947    2 Sheets-Sheet 2
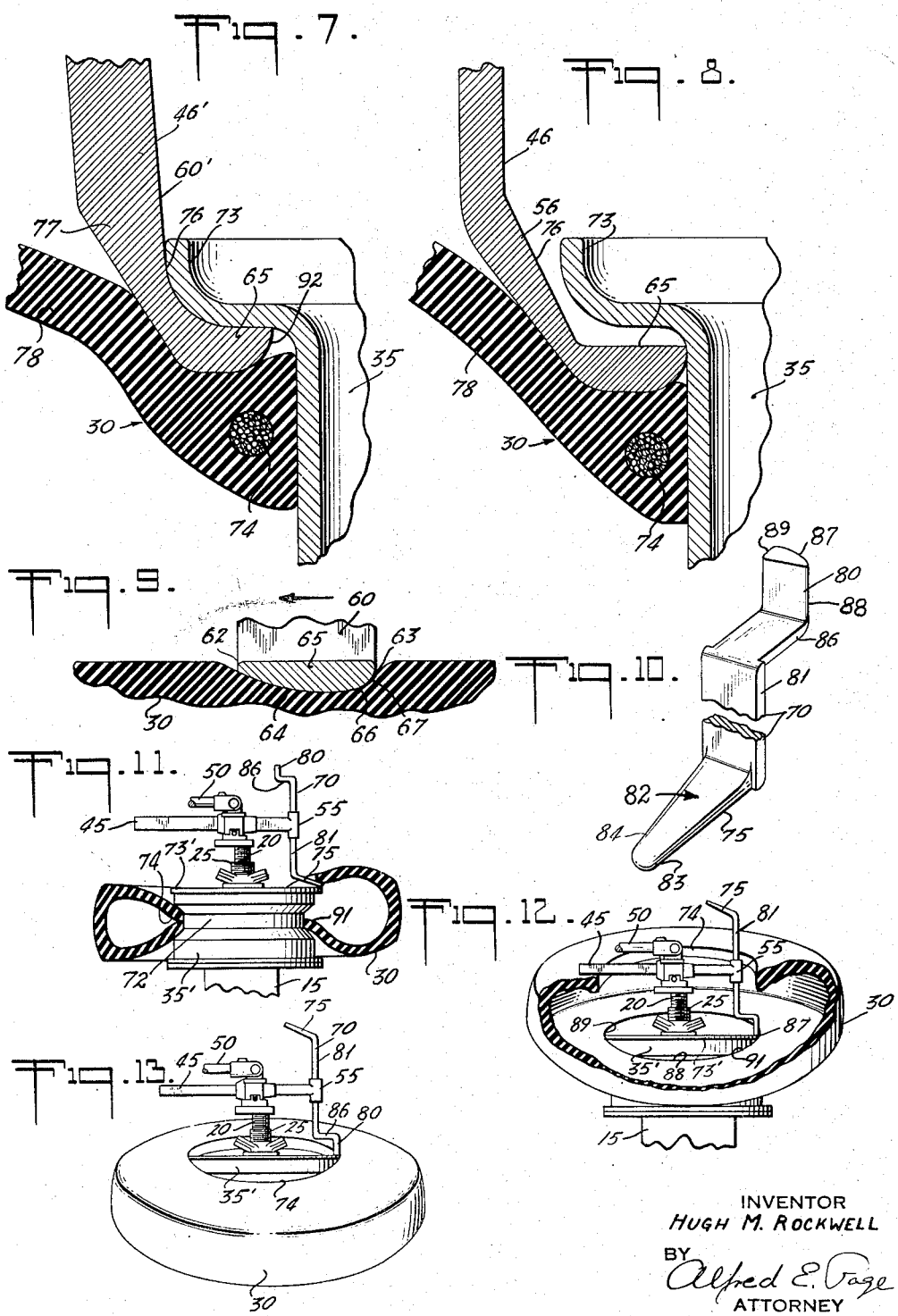
INVENTOR
HUGH M. ROCKWELL
BY
Alfred E. Gage
ATTORNEY Patented Dec. 8, 1953

2,661,793

UNITED STATES PATENT OFFICE 2,661,793

CIRCUMFERENTIALLY TRAVELING TYPE TIRE MOUNTING AND DEMOUNTING APPARATUS

Hugh Monroe Rockwell, Freeport, N. Y.

Application July 2, 1947, Serial No. 758,598

13 Claims. (Cl. 157—1.24)

1

This invention relates to tire mounting and demounting machines of the type disclosed in my copending application upon Tire Mounting and Demounting Machine of the Type Having Relative Travel Between a Tire and a Tire Tool, Serial No. 633,698, filed December 8, 1945, now Patent No. 2,547,976, granted April 10, 1951. The present invention is more particularly directed to improved tool holding means and improved tire operating tools for use with such machines.

Machines of the stated type generally include a stand on which a rim, a wheel or a disk wheel, with tire attached may be clamped, a rotatable central arbor threadedly engaged in a relatively fixed nut, a tool holder rotatable with the arbor, and a tire engaging tool on the holder. As the holder is rotated, it is drawn down by the threading of the arbor into its nut, this being a movement which causes the tool to follow a helical path relative to the tire.

The tool is preferably engaged with the tire as near to a bead of the tire as possible, so that the action of the tool on the tire loosens the bead from its seat. The required action involves means for quickly and easily moving the tool laterally of the tire to place in under the wheel or rim flange. Also, as the pressure is concentrated fairly heavily on one incremental wall section of the tire, the tool should have a bearing surface so designed as to exert pressure on the bead without risk of cutting or breaking the tire wall. It is further desirable, from a practical standpoint, to construct these machines to handle different types and sizes of wheels.

After the tire beads have been loosened, they must be pried over the rim flanges to remove the tire for inspection and repair. In practice, it has been found that an "on-off" tool of different design instead of merely a bead "stripper" tool performs this latter function with greater facility. Such an "on-off" tool should also be capable of operating to pry off the lower tire bead without interference from the previously freed upper bead.

It is accordingly among the objects of this invention to provide a tire mounting and demounting machine of the described type including a tool holder off-set from the arbor to provide a greater range of easy and ready adjustment of the tool laterally of the tire.

Another object is to provide an improved tool holding clamp capable of interchangeably receiving different tools and holding them fixed relatively during the tire operation, while still permitting ready release to free the tool even under pressure.

2

Another object is to provide an improved bead stripper tool having a novel design of tire bearing surface providing for quick and easy insertion of the tool beneath the rim flange while bearing directly on the bead, and also providing for a "kneading" action of the tire of such a nature that the rubber actually "flows" around the tool bearing surface.

Still another object is to provide such a "stripper" tool which automatically eliminates any binding on the rim when the tool is moved radially or axially.

A further object is to provide a novel combination "on-off" tool for prying the loosened beads over the rim flange and including an "off" toe for removing the beads and an off-set "on" toe for replacing the beads over the flange while permitting the tool to operate on the lower bead without interference with the upper bead.

A still further object is to provide such an "on-off" tool having an "off" toe so oriented that it automatically follows the tire bead and clears the rim flange as it is moved into operative position.

These, and other objects advantages and novel features of the invention, will be apparent from the following description and the accompanying drawings.

In the drawings:

Fig. 1 is a plan view, partly broken away, of a tire supporting stand or base and a novel tool support drive bar assembly embodying the present invention.

Fig. 2 is an elevation view of the stand, with a tire in section and rim or wheel thereon, and of the drive bar and tool support assembly showing a stripper tool just prior to the beginning of a bead stripping operation.

Fig. 3 is a plan view of an improved tool holding clamp forming part of the present invention, with the tool shank in section.

Fig. 4 is a front elevation view, partly in section, of the clamp shown in Fig. 3.

Figs. 5 and 6 are side and front elevations, respectively, of the lower end of a stripper tool made according to the present invention.

Fig. 7 is an enlarged vertical sectional view of a modified form of stripper tool showing its relation to the tire in a bead stripping operation.

Fig. 8 is a vertical sectional view similar to Fig. 7 showing the tool of Figs. 5 and 6.

Fig. 9 is a vertical sectional view illustrating the action of the toe of the stripper tool on the rubber of a tire, as the tool is forced around the tire.

Fig. 10 is a perspective view of an "on-off" tool made according to the present invention.

Fig. 11 is an elevation view showing the "on-off" tool of Fig. 10 as used in starting to lift a bead over a rim flange.

Fig. 12 is an elevation view showing the "on-off" tool as used in replacing the lower bead of a tire partly broken away over the rim flange.

Fig. 13 is an elevation view showing the "on-off" tool replacing the upper bead of a tire over the rim flange.

As stated, the present invention is directed to improvements in the machines of the type disclosed in the said patent granted on my copending application, Serial No. 633,698. A machine substantially similar, in basic construction and function, to the machine of my copending application aforesaid is shown in Figs. 1, 2, 11, 12 and 13 of the drawings herein.

Referring more particularly to these figures, the said machine includes a wheel supporting base or stand 15 and a rotatable arbor 20 which is threadable into and out of the interior of a relatively fixed nut or threaded sleeve 25 secured axially in the stand 15. The stand 15 supports a tire 30 mounted on a removable rim or a disk wheel 35, as shown in Fig. 2, which is secured to the stand, in the manner described in the said patent granted on my copending application aforesaid, so that the wheel 35 is held against rotation on the stand.

A drive bar and tool support assembly 40 is mounted on the upper end of arbor 20, and includes a tool support 45 in a tool holder support 31 and a drive bar arrangement 50 in the form of a yoke 38 connected by a pin 39 to a crank pin 32 for revolving a tool secured in a tool holding clamp 55 on the outer end of support 45. In Fig. 2, a bead stripper tool 60 is shown engaged in clamp 55, whereas in Figs. 11, 12 and 13 an "on-off" tool 70 is shown secured in the clamp.

The arrangement for moving the tool operates in the same manner as described in the said patent granted on my copending application. Through eccentric means included in the assembly 40, tool holder 45 is quickly adjustable laterally of tire 30 to bring the toe 65 of tool 60 beneath the flange of the wheel rim 35 and into engagement with the upper bead of tire 30. As tool 60 is revolved by drive bar arrangement 50, tool 60 follows a helical path due to arbor 20 threading into the fixed nut or sleeve 25. Toe 65 exerts a kneading action on the upper bead, loosening it from its rim seat. As the downward movement continues, the lower bead is also loosened and tire 30 drops off its rim 35.

If the rim is of the drop center type, such as the wheel rim 35' of Figs. 11, 12 and 13, the upper bead is first forced to drop into the drop center of the wheel. The tire and rim are then removed from stand 15 and again secured thereon in the inverse position. The other bead is then forced into the center well of the rim 35' in the same manner. Tool 60 is then quickly disengaged from clamp 55 and "on-off" tool 70 secured in the clamp. A tire iron or the like is used to pry up a portion of the upper tire bead and tool 70 is moved outwardly to engage its "off" toe 75 under the bead. Drive bar assembly 50 is then swung counter-clockwise to pull the remainder of the upper bead over the flange of rim 35'. The same operation is repeated to pry the lower bead over the rim flange.

In replacing a tire on its rim, tool 70 is reversed in position in clamp 55 so that its off-set "on" toe 80 is lowermost, as in Figs. 12 and 13. This toe 80 is then successively engaged with each bead to force the beads outwardly over the rim flange, by a rotary movement.

The novel features of the present invention relate more particularly to the eccentric or off-set mounting of tool support 45, the tool clamp 55, and the construction of tools 60 and 70. The off-set mounting of the tool support 45 permits the tool to be fixed in position relative to its support 45, with the tool passing to one side of the arbor 20 and the lateral or radial adjustment of the tool in both directions relative to the drive bar 50 is effected by movement of support 45. Clamp 55 is especially designed to hold the tool firmly, when pressure is exerted thereon, while still permitting ready release of the tool for interchanging the same. Tool 60 is designed so that it can be quickly engaged beneath the rim flange and aligned with the bead. This is important, as the pressure should be exerted on the reinforced bead itself and not on the tire wall beyond the bead, any more than is necessary. A very desirable feature of tool 70 is its ready interchangeability in clamp 55 and its off-set "on" toe 80 which enables the tool to clear an upper tire bead when operating on a lower bead. All of these features, as well as important constructional details will now be described more in detail.

The base or stand 15, which is generally similar to the tire supporting stand shown in the said patent granted on my said copending application above referred to, comprises a base 16 suitably bolted to the floor or other supporting surface and joined by column 17 to a mounting plate 18. This plate is provided with a series of threaded holes 19 for receiving suitable clamping means to fasten a wheel or rim, such as a disc wheel, on the stand, airplane wheels instead being held by friction as in my copending application aforesaid. A diametric "master" line 21 is marked on the plate 18 which has holes 22 aligned therewith and which are likewise threaded to receive clamping means for a wheel or rim. The holes 19 and 22 are so distributed that practically any wheel or rim can be placed on the stand 15 and secured thereto by suitable clamps, studs or the like as described in my copending application aforesaid. For example, if a disk wheel is placed on the stand 15, it may be centered thereon with one wheel hole lined up with a hole 22 on "master" line 21. Two other wheel holes will then line up with holes 19 in the plate.

In the same manner as described in my said copending application, stand 15 removably receives threaded arbor 20 which is threaded into a nut or threaded sleeve 25 clamped in position by a readily releasable clamp in column 17 operated by handle 23. As this clamp is completely shown and described in my patent aforesaid, it has not been believed necessary to illustrate the details thereof in the present case. It should be understood that any desired arrangement for locking nut or sleeve 25 against rotation in stand 15 can be used, such as a collar clamp or other type of locking arrangement sufficient to prevent the nut or sleeve from turning relative to stand 15.

The drive bar and tool support assembly 40 is an important feature of the present invention and differs from that shown in my said copending application in that the tool holder 45 is off-set from the axis of arbor 20. This off-set arrangement provides greater facility in adjustment of the tool holder for operation on different size tires and rims. For this purpose, the tool holder, which is preferably rectangular in cross-section, slides through an elongated aperture in a tool holder support or clamp 31 which is rotatably mounted on a crank pin or boss 32. Boss 32 is integral with a substantially circular plate 33 secured in eccentric relation to arbor 20. A locking pin 34 is mounted in the tool holder support 31, and may engage in any one of series of holes 36 around the periphery of plate 33.

The drive bar arrangement 50 includes a socket 37 having a forked end 38 which is pivotally secured on a pin 39 extending through the crank pin or boss 32. Socket 37 is arranged to receive any desired type of drive bar 50. Preferably, the drive bar comprises a tubular member and socket 37 is likewise tubular.

The arrangement so far described operates in substantially the same manner as does the apparatus in my copending application aforesaid. The eccentric arrangement including the plate 33 having the holes 36 cooperable with the pin 34 on tool holder support 31 is substantially identical in function with the previous arrangement, the only difference being that, in the present instance, the tool holder 45 is off-set from arbor 20 so that it may be readily adjusted longitudinally through tool holder support 31 in either direction. To maintain the adjustment when made, a suitable wedge device is provided in tool holder support 31 and tightened by a stud, said device being indicated generally at 41 and constructed like the wedging device for holding the tool hereinafter described and shown in Figs. 3 and 4.

For this purpose, the outer end of tool holder 45 carries tool supporting bracket or clamp 55 in which the tire operating tools, such as the stripper tool 60 and "on-off" tool 70, are interchangeably receivable. Bracket 55 is more clearly shown in Figs. 3 and 4 as comprising a pair of elongated jaws 42 and 43 with lateral recesses receiving the shank of a tool, such as stripper tool 60. Jaw 43 has an off-set boss 44 having an elongated aperture 46, the outer end of which is threaded as at 47. The inner portion of aperture 46 receives a cylindrical wedge 48, which has a flat surface adapted to bear against the shank of the tool and force the tool tightly into jaw 42. Wedge 48 has a cylindrical T-head 49 engaged in a slot in a flanged head portion 51 of a locking screw stud 52. Stud 52 is threaded into aperture 46, and is provided with a square head 53 for receiving a suitable wrench. The screw or stud 52 is freely rotatable with respect to wedge 48, and the wedge may be tightened or loosened by turning movement of stud 52. Thus, the tool is firmly clamped in the jaws 42, 43 of clamp 55.

The stripper tool 60, which is an important feature of the present invention, is shown most clearly in Figs. 5 and 6. Tool 60 includes a shank portion 46' which is reduced in width, as at 47'. The reduced width portion 47' enables the tool to be quickly engaged and disengaged with respect to tool clamp 55. This is made possible because the width of portion 47' is less than the lateral distance between the lips of jaws 42, 43. Consequently, the tool may be placed in the clamp by placing the reduced width portion 47' through the lips of jaws 42, 43 after which the tool is dropped down inside the jaws to the desired position. The width of the main portion of shank 46' is substantially equal to the width of the inner surfaces of jaws 42, 43 but such as to permit entry between said jaws 42, 43. Thus, only a slight tightening or loosening of wedge 48 is required to lock the tool in place or to disengage the tool.

In the operative position of tool 60, shank 46' is substantially perpendicular to the ground. However, in order that tool 60 will clear the rim or wheel of a tire as it pushes the bead downwardly, the shank of the tool should preferably slant inwardly with relation to the tire and wheel, as shown in Fig. 2. Another way to provide clearance is to use the constructions shown in Figs. 5 and 6 wherein shank 46' is continued at its lower end into an angular portion 56 connecting the shank to the toe 65 of the tool. The angularity of portion 56 is such that shank 46' will automatically free itself from contact with the wheel rim as the tool is moved downwardly as shown in Fig. 3.

On of the important features of tool 60 is the contour of toe 65. It will be noted that toe 65 has a transverse width substantially equal to the width of the main part of shank 46', thus providing a longer surface to distribute the pressure on the tire bead. The upper surface 61 of the toe may be substantially flat. The under surface is curved, and generally increasing in thickness from the leading edge 62 toward the trailing edge 63. For example, a circumferential incline or oblique curved surface 64 extends rearwardly and downwardly from leading edge 62 and is joined by a substantially flat or very slightly curved section 66 to the more steeply curved surface 67 adjacent the trailing edge 63. The under surface of toe 65 is likewise curved transversely as will be clear from Fig. 5, and this surface may be slightly flattened, as at 68, where the greatest bearing effect on the tire occurs and is then inclined upwardly on the outer surface of the toe, as shown in Figs. 5, 7 and 8.

As explained, in loosening the beads of a tire 30 having a deflated inner tube 71 and mounted on a rim or disk wheel 35 secured on stand 15, tool 60 is first lined up with the edge of toe 65 just outside the flange 73 of the rim or disk wheel. The tool is then brought down into bearing engagement with the tire wall as close as possible to flange 73 within slight needed clearance. Pin 34 is then withdrawn from a hole 36, which frees tool holder support 31 from plate 33. Drive bar 50 is then turned and, due to the eccentric relation of boss or crank pin 32 to arbor 20, tool support 45 and tool 60 are moved inwardly or outwardly relative to the axial center of wheel 35 when the pin 34 is removed from the holes 36. This aids in loosening the tire from the wheel 35.

If the drive bar is swung in one direction with the pin 34 disengaged, toe 65 is forced beneath flange 73 and into engagement with the bead of the tire. Pin 34 is then re-engaged in another hole 36 to hold the tool drawn in. Turning of arbor 20 in its threaded sleeve 25 then effects relative movement of tool 60 along tire 30, and toe 65 exerts a kneading action on the tire due to the "give" of the rubber. As the tool is revolved, it is at the same time moved downwardly due to the threading clockwise of arbor 20 into its nut 25. This helical movement of the tool forces the upper bead of the tire to slide downwardly along rim or wheel 35.

The action of the toe 65 will be better understood with reference to Figs. 7, 8 and 9. Fig. 7 shows an ideal tool for getting in quickly underneath rim 35 and over the wire core 74 of the bead of tire 30. It will be noted that, in this ideal tool, the inner surface 76 of tool 60' in Fig. 7 is curved to closely follow the contour of rim 35. The outer surface 77 of the tool 60' is sloped to follow the natural contour of the tire wall 78 as bead 74 is pushed downwardly. The shank 46' of tool 60' slopes outwardly and upwardly so that, as the tool forces the bead downwardly, the shank automatically clears itself of any frictional contact with flange 73 of rim or wheel 35. This is important, as under the stresses exerted on tool 60' there may be a tendency due to lost motion in the machine for the tool to move inwardly slightly, which would cause the shank 46' to bind against flange 73. With the shank sloped outwardly, of course, no such binding can occur because the necessary clearance is provided.

While the tool referred to as being shown in Fig. 7 is of an ideal shape, for practical reasons, and to adapt the tool to different sizes and shapes of rims and wheels, the tool may be constructed as shown in Figs. 5, 6 and 8. As shown in Fig. 8, the angular portion 56 joining toe 65 to shank 46, while not fitting as closely to flange 73 as in the case of shank 46', does enable the toe 65 to get in quickly beneath the flange and over the bead carrying the wire core 74. The bent or angular section 56 provides the necessary clearance with regard to the outside of flange 73 to prevent binding.

Fig. 9 shows the action of the tool on the tire. Assuming that the tool is traveling in the direction indicated by the arrow, the curved leading edge 62, joined by the sloping inclined or curved surface 64 to the lower portion 66, allows the rubber of the tire to flow smoothly beneath toe 65. The action of the rubber under the pressure of toe 65 resembles that of a fluid, and the rubber tends to flow up and around the trailing edge 63. As the tool moves to the left in Fig. 9, there is a continuous roll or give of the rubber beneath the toe 65 to provide the described kneading action. The section of toe 65, having the described contours, is much more effective by reason thereof, in loosening the bead and eliminates danger of injury to the tire which sometimes occurred with previous tools.

After the tire beads have been loosened as described, the "on-off" tool 70, shown in Fig. 10, is used to pull the beads over the rim or wheel flanges. This tool comprises an intermediate shank portion 81 fitting into the clamp 55 in the same manner as the shank 46 of stripper tool 45. The "off" portion of the tool comprises a rounded tapered toe 82 slanted at such an angle from shank 81 that it automatically frees or clears itself from the flange 73' of wheel 35' as will be apparent from Fig. 11 when being moved counter-clockwise. In other words, as tool holder 45 is moved outwardly, the vertical distance from the bottom surface of toe 82 relative to wheel 72 is increased. The leading edge 83 of toe 82 is of less depth than the trailing edge 84 and the upper surface of the toe is rounded between its leading and trailing edges.

On the other end of shank 81 is the "on" portion of the tool comprising a horizontal intermediate section 86 and a toe portion 80 extending substantially parallel to shank 81. In this case, likewise, the tire engaging surface 87 is curved rearwardly from the relatively narrow leading edge 88 to the wider trailing edge 89. Both "off" toe 75 and "on" toe 80 are less in width than the lateral dimension between the lips of jaws 42, 43 of clamp 55 so that the tool 70 may be easily engaged in and disengaged from the tool holder support.

The action of tool 70 is best shown in Figs. 11, 12 and 13. Fig. 11 shows the use of tool 70 to lift a bead over the flange 73' of wheel 35'. As a first step, a tire iron or pry bar is used to push a portion of the upper bead 74 of the tire above flange 73'. Tool 70 is then moved outwardly, through the use of the eccentric on the drive bar assembly, to engage toe 75 beneath bead 74 so that the inclined toe 75 automatically clears itself from the wheel rim, when the tool 70 is rotated. Drive bar 50 is then swung counter-clockwise. This pulls the rest of the bead 74 over the flange 73' and at the same time lifts the bead. The thread on the arbor 20 is helpful in making sure of maintaining clearance between the tool 70 and the rim 73'. The same action is repeated to pull the lower bead 91 over flange 73'.

Fig. 13 shows the first step in replacing tire 30 on wheel 35'. Tool 70 is reversed in clamp 55 so that the "on" toe portion 80 is in the lower position in the clamp 55. By outward movement of tool holder 45, the curved tire engaging surface of toe 80 is engaged with the inside of the lower bead 91. Drive bar 50 is then swung counter-clockwise and tool 70 pushes bead 91 over flange 73'. In this operation, the outer surface of toe 80 is substantially aligned radially with the outer surface of flange 73'.

The upper bead 74 is then forced over flange 73' in the same manner. Toe 80 is engaged with the bead, through adjustment of tool holder 45, to move tool 70 outwardly, after which the drive bar is swung counter-clockwise to move toe 80 along bead 74 and force the bead out beyond flange 73'.

The described invention provides a novel and very practical arrangement for removing and replacing tires relative to their rims or wheels. The fundamental portion of the apparatus operates on essentially the same principle as does that disclosed in my copending application referred to above. However, the use of the off-set bracket for the tool holder 45 permits ready adjustment of the tool holder radially of the tire, thus eliminating the necessity for adjusting the tool itself along its holder, as in my prior application.

The novel stripper tool arrangement, in cooperation with the bracket or clamp 55 permits ready insertion and adjustment of not only the stripper tool 60 but also the "on-off" tool 70 in the bracket 55. This is accomplished by the reduced width shank section 47' of tool 60 and the reduced width toe portions 75, 80 of tool 70. The width of these reduced portions is less than the lateral distance between the inner edges of clamp jaws 42, 43 thus permitting, in the case of tool 60, the easy insertion of the tool into the clamp by holding the tool parallel with the clamp face and moving it inwardly. This is of great importance where clearances may be limited, preventing tool 60 when in place from being withdrawn vertically from clamp 55. Likewise, the relatively narrow intermediate section 86 and the reduced width of the toe 75 of tool 70, which are narrower than the distance between the jaws 42, 43, permit this tool, which is shorter than tool 60, to be readily inserted in clamp 55. As will be noted from Fig. 12, the off-set arrangement of toe 80 provides for the shank 81 of the tool clearing the upper tire bead while the lower tire bead is being forced over the rim or wheel flange.

The inclined under surfaces of the toe 65 of tool 60 provides for an easy kneading action at the toe, of the rubber of the tire and permits the rubber to flow past the toe as it moves along the bead. The curved inner edge 92 of toe 65 provides for easy forcing of the toe radially inwardly between the flange of the rim or wheel and the bead of the tire. The slanted intermediate shank section 56 effects automatic clearing of the tool from frictional contact with the rim or wheel as the tool is moved downwardly.

The clamp 55 is likewise a very important feature of the invention. The frictional clamping effect afforded by the wedge 48 permits of ready release of the tool even under pressure. Referring to Fig. 4, the pressure on the tool from the clamp is exerted downwardly, so that the reaction of the tool is upwardly. Thus, the greater the pressure, the more tightly wedge 48 grips the shank of the tool. However, the wedge may be quickly released by turning of screw stud 52.

While specific embodiments of the invention have been shown and described in detail to illustrate the application of the principles thereof, it will be understood that the invention may be otherwise embodied without departing from such principles.

What is claimed is:

1. In a tire mounting and demounting machine of the type in which relative revolution is effected between a tire and a tool engaged therewith to loosen the tire from its carrier, and including a tire supporting stand and an arbor extending axially of a tire thereon, a rotatable bracket having a journal bearing secured to said arbor and having a substantially horizontal aperture extending therethrough transversely of the tire, the aperture being spaced radially off center from the journal bearing axis, and an elongated tool support slidable through the aperture at one side of the journal bearing and extending transversely of the tire.

2. In a tire mounting and demounting machine of the type in which relative revolution is effected between a tire and a tool engaged therewith to loosen the tire from its carrier, and including a tire supporting stand and an arbor extending axially of a tire thereon, a rotatable bracket having a journal bearing secured to said arbor and having a substantially horizontal aperture extending therethrough transversely of the tire, the aperture being spaced radially off center from the journal bearing axis, an elongated tool support slidable through the aperture at one side of the journal bearing and extending transversely of the tire, and means effective to lock said support in adjusted position in the aperture.

3. In a tire mounting and demounting machine of the type in which relative revolution is effected between a tire and a tool engaged therewith to loosen the tire from its carrier, and including a tire supporting stand and an arbor extending axially of a tire thereon, a rotatable bracket having a journal bearing secured to said arbor and having a substantially horizontal aperture extending therethrough transversely of the tire, the aperture being spaced radially off center from the journal bearing axis, an elongated tool support slidable through the aperture at one side of the journal bearing and extending transversely of the tire, and a tool holder secured together with the outer end of said support.

4. In a tire mounting and demounting machine of the type in which relative revolution is effected between a tire and a tool engaged therewith to loosen the tire from its carrier, the tool being held in a support extending laterally of the tire relative to an arbor extending axially of the tire, a tool holder secured together with the outer end of said support, said holder having laterally spaced parallel jaws arranged to receive the shank of the tool, and releasable wedge means, including a wedge having an annular recess in a circular head and a recess-engaging head on a screw for moving the wedge forwardly and rearwardly, operatively associated with at least one of said jaws and effective to frictionally grip the tool shank when the wedge has been moved forwardly.

5. In a tire mounting and demounting machine of the type in which relative revolution is effected between a tire and a tool engaged therewith to loosen the tire from its carrier, the tool being held in a support extending laterally of the tire relative to an arbor extending axially of the tire, a tool holder secured together with the outer end of said support, said holder having laterally spaced parallel jaws equipped with lateral recesses arranged to receive the shank of the tool, a tool securable in said clamp and having a shank portion of a width approximately that of the lateral spacing of the bottom of the recesses and a shank portion of less width than the lateral spacing of said jaws, whereby said tool may be readily disengaged from said clamp recesses by aligning said section with said jaws, and releasable clamping means operatively associated with at least one of said jaws and effective to frictionally grip the tool shank.

6. In a tire mounting and demounting machine of the type in which relative revolution is effected between a tire and a tool engaged therewith to loosen the tire from its carrier, the tool being held in a support extending laterally of the tire relative to an arbor extending axially of the tire, a tool holder secured together with the outer end of said support, said holder having laterally spaced parallel jaws arranged to receive the shank of the tool, a wedge having an annular recess in a circular head movable along the inner surface of one jaw, and screw means, having a head engaging said recess, rotatably secured for movement with said wedge to adjust the same longitudinally of the jaw forwardly and rearwardly to frictionally grip the tool shank when the wedge has been moved forwardly.

7. In a tire mounting and demounting machine of the type in which relative revolution is effected between a tire and a tool engaged therewith to loosen the tire from its carrier, the tool being held in a support extending laterally of the tire relative to an arbor extending axially of the tire, a tool holder secured together with the outer end of said support, said holder having laterally spaced parallel jaws arranged to receive the shank of the tool, a wedge having an annular recess in a circular head movable along the inner surface of one jaw, and screw means, having a head engaging said recess, rotatably and detachably secured for movement forwardly and rearwardly with said wedge to adjust the same longitudinally of the jaw to frictionally grip the tool shank when the wedge has been moved forwardly.

8. In a tire mounting and demounting machine of the type in which relative revolution is effected between a tire and a tool engaged therewith to loosen the tire from its carrier, the tool being held in a support extending laterally of the tire relative to an arbor extending axially of the tire, a tool holder secured together with the outer end of said support, said holder having laterally spaced parallel jaws equipped with lateral recesses arranged to receive the shank of the tool, a tool securable in said clamp and having a shank portion of a width approximately that of the lateral spacing of the bottom of the recesses and a shank portion of less width than the lateral spacing of said jaws, whereby said tool may be readily disengaged from said clamp recesses by aligning said section with said jaws.

9. In a tire mounting and demounting machine of the type in which relative revolution is effected between a tire and a tool engaged therewith to loosen the tire from a wheel rim having a flange, a bead stripper tool including a shank arranged to be received in a tool holder, a substantially horizontal toe, having less depth than such a flange, projecting laterally relative to said shank for engagement with a tire bead and a portion oblique to and interconnecting said toe and shank, whereby, as said tool is moved axially relative to the tire, said shank will be free from binding with regard to the said flange.

10. In a tire mounting and demounting machine of the type in which relative revolution is effected between a tire and a tool engaged therewith to loosen the tire from a wheel rim having a flange, a bead stripper tool including a shank arranged to be received in a tool holder and a substantially horizontal toe projecting laterally relative to said shank for engagement with a tire bead, said toe having an undersurface for engagement with the tire characterized by a circumferentially inclined surface extending rearwardly from the leading edge of the toe, and a relatively steeper inclined surface extending forwardly from the trailing end of the toe.

11. In a tire mounting and demounting machine of the type in which relative revolution is effected between a tire and a tool engaged therewith to loosen the tire from its carrier, and including means for adjusting the tool radially of the tire, a tool for prying a tire bead over a flange on the carrier including a shank extending substantially parallel to the tire axis and a toe projecting radially outwardly from the shank to engage beneath a tire bead and pry it over the flange, the lower surface of said toe slanting upwardly toward the tire axis whereby, as the tool is adjusted radially outwardly, said toe will automatically clear the tire carrier.

12. In a tire mounting and demounting machine of the type in which relative revolution is effected between a tire and a tool engaged therewith to loosen the tire from its carrier, and including means for adjusting the tool radially of the tire, a tool for prying a tire bead over a flange on the carrier including a shank extending substantially parallel to the tire axis, a first toe projecting radially outwardly from one end of the shank, the lower surface of said toe slanting upwardly toward the tire axis whereby, as the tool is adjusted radially outwardly, said toe will automatically clear the tire carrier, an off-set portion extending oppositely to said first toe from the opposite end of the shank and a second toe extending from said off-set portion substantially parallel to the shank and having a curved outer surface arranged to engage the radially inner surface of a tire bead to force the bead outwardly over the carrier flange, said off-set portion preventing interference between the upper bead of a tire and the tool when remounting the lower tire bead.

13. A bead stripper tool for stripping a tire from a wheel rim, including a shank arranged to be received in a tool holder, having a toe projecting laterally relative to said shank for engagement with the tire bead, with an outer face oblique to and interconnecting said toe and shank, said shank being located in a position unobstructed by the wheel rim in stripping the tire from the rim and having a reduced width portion adjacent the toe enabling the tool to be quickly engaged and disengaged.

HUGH MONROE ROCKWELL.

References Cited in the file of this patent

UNITED STATES PATENTS

| Number | Name | Date |
| --- | --- | --- |
| 945,675 | Barnes | Jan. 4, 1910 |
| 1,341,727 | Weaver | June 1, 1920 |
| 1,385,948 | Norlund | July 26, 1921 |
| 1,402,471 | Beck | Jan. 3, 1922 |
| 1,452,596 | Fernelmont | Apr. 24, 1923 |
| 1,646,511 | Weaver et al. | Oct. 25, 1927 |
| 1,742,590 | Freivogel | Jan. 7, 1930 |
| 1,793,864 | Manley | Feb. 24, 1931 |
| 2,201,982 | Bazarek | May 28, 1940 |
| 2,418,849 | Polt | Apr. 15, 1947 |
| 2,421,856 | Teegarden | June 10, 1947 |

FOREIGN PATENTS

| Number | Country | Date |
| --- | --- | --- |
| 765,192 | France | Mar. 19, 1934 |